J. O. Burch,
Lifting Jack.
No. 92,157.  Patented July 6, 1869.
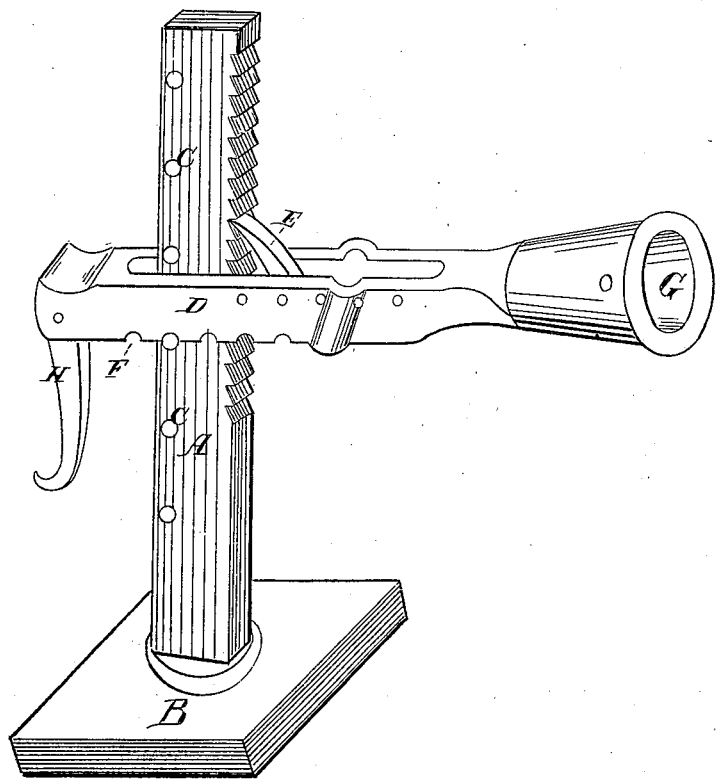
Witnesses
H. W. Dopp
Edw. Suckow
John O. Burch

United States Patent Office.

JOHN O. BURCH, OF BUFFALO, NEW YORK.

Letters Patent No. 92,157, dated July 6, 1869.

IMPROVED CARRIAGE-JACK.

The Schedule referred to in these Letters Patent and making part of the same.

*To all whom it may concern:*

Be it known that I, JOHN O. BURCH, of the city of Buffalo, in the county of Erie, in the State of New York, have invented an Improved Carriage-Jack; and I do hereby declare that the following is a full and exact description thereof, reference being had to the accompanying drawing, and to the letters of reference marked thereon.

The nature of my invention consists in providing a carriage-jack with an adjustable lever, so arranged that the same may be adjusted up or down, or its arms may be lengthened or shortened.

I refer to the drawing, which represents the carriage-jack in a perspective view, of which A is the upright or support. The same is made of iron, and secured to a base or block of wood, B.

Said upright is provided with a series of small prongs or projections, C, upon which lever D has its support or fulcrum; also, with a series of ratchet-teeth. The same have for their purpose, in conjunction with pawl E, to hold the lever D, after it is borne down, in a position as may be desired.

D is the lever. It is provided with a series of notches, F, on its lower side. The same correspond with the prongs C; also, with a pawl, E, which may be adjusted so as to correspond with the notches F; also, with a socket, G, for the purpose to receive a wooden extension; and with a hook, H, which may be useful once a while.

Said lever D is adjustable on upright A up or down, and it may be lengthened or shortened most easily by shifting the lever from one notch into another, as can be plainly seen by a look at the drawing.

Having thus fully described my invention,
What I desire to secure by Letters Patent, is—

The standard A, having the ratchet-teeth shown, and the prongs or projections C, with the adjustable lever D, having notches F, hook H, and the adjustable pawl E, all constructed, arranged and operated as described, for the uses and purposes set forth.

JOHN O. BURCH.

Witnesses:
H. WM. DOPP,
EDMUND SUCKOW.